US011896057B2

(12) United States Patent
Doyle et al.

(10) Patent No.: US 11,896,057 B2
(45) **Date of Patent: *Feb. 13, 2024**

(54) ELECTRONIC VAPORIZER WITH AUTOMATED THERMAL PROFILE CONTROL

(71) Applicant: The Kanvas Company Inc., Newport Beach, CA (US)

(72) Inventors: Joseph Gordon Doyle, Fountain Valley, CA (US); Andy Fathollahi, Newport Beach, CA (US); Alexander Wayne Gordon, Irvine, CA (US)

(73) Assignee: The Kanvas Company Inc., Newport Beach, CA (US)

( * ) Notice: Subject to any disclaimer, the term of this patent is extended or adjusted under 35 U.S.C. 154(b) by 855 days.

This patent is subject to a terminal disclaimer.

(21) Appl. No.: 16/850,324

(22) Filed: Apr. 16, 2020

(65) Prior Publication Data

US 2020/0329766 A1 Oct. 22, 2020

Related U.S. Application Data

(63) Continuation of application No. 16/389,851, filed on Apr. 19, 2019, now Pat. No. 10,653,187.

(51) Int. Cl.

*A24F 40/50* (2020.01)
*G08C 17/02* (2006.01)
*A24F 40/42* (2020.01)

(52) U.S. Cl.

CPC .............. *A24F 40/50* (2020.01); *A24F 40/42* (2020.01); *G08C 17/02* (2013.01)

(58) Field of Classification Search

None

See application file for complete search history.

(56) References Cited

U.S. PATENT DOCUMENTS

| | | | | |
|---|---|---|---|---|
| 9,713,345 | B2 | 7/2017 | Farine | |
| 10,653,187 | B1 * | 5/2020 | Doyle | A24F 40/42 |
| 2003/0056791 | A1 | 3/2003 | Nichols | |
| 2005/0045179 | A1 | 3/2005 | Faison, Jr. | |
| 2005/0235991 | A1 | 10/2005 | Nichols | |
| 2016/0007651 | A1 | 1/2016 | Ampolini | |

(Continued)

*Primary Examiner* — James Harvey

(74) *Attorney, Agent, or Firm* — Orbit IP, LLP

(57) ABSTRACT

Vaporization devices, systems, and methods with automated thermal profile control are disclosed. Thermal profile information for a particular vaporizable material is encoded to control the operation of the vaporizer. The thermal profile is defined by a plurality of set points specified by power/temperature setting for a specified time. The thermal profile may be configured to be applied during a single or multiple inhalations. A thermal profile recipe code containing thermal profile information associated with the vaporizer cartridge and/or vaporizable material contained therein may be used to control the thermal profile. The thermal profile information may be automatically read by or communicated to the vaporizer and used thereby to automatically control the vaporizer heating element to implement the desired thermal profile associated with the vaporization material. User controls/inputs and sensors are provided to facilitate adjustment or adaptation of a thermal profile, including to particular use conditions.

20 Claims, 5 Drawing Sheets

Thermal Profile Example #2

(56) References Cited

U.S. PATENT DOCUMENTS

| | | | | |
|---|---|---|---|---|
| 2016/0200463 | A1 | 7/2016 | Hodges | |
| 2016/0227838 | A1* | 8/2016 | Johnson | A24F 40/46 |
| 2016/0309788 | A1 | 10/2016 | Hawes | |
| 2018/0104214 | A1 | 4/2018 | Raichman | |
| 2019/0053540 | A1 | 2/2019 | Baker | |
| 2019/0158938 | A1 | 5/2019 | Bowen | |
| 2019/0200675 | A1 | 7/2019 | Bache | |
| 2021/0378313 | A1* | 12/2021 | Qiu | A24F 40/60 |
| 2022/0329766 | A1* | 10/2022 | Ismailova | H04N 9/77 |

* cited by examiner

ELECTRONIC VAPORIZER WITH AUTOMATED THERMAL PROFILE CONTROL

INCORPORATION BY REFERENCE TO RELATED APPLICATIONS

The present application is a continuation of U.S. patent application Ser. No. 16/389,851, filed Apr. 19, 2019, which is hereby incorporated herein by reference in its entirety.

TECHNICAL FIELD

The field of the invention relates to vaporizing devices, such as electronic vaporizers, and to systems and methods of using, controlling and making such devices that automate or otherwise implement thermal profile control.

BACKGROUND

Vaporizers, also known as electronic vaporizers ("e-vaporizers"), vapes, electronic nicotine delivery systems ("ENDS"), and plant-based vaporization devices, are commonly utilized to vaporize vaporizable material for inhalation by a patient, consumer or other end-user. Such vaporizable material may be comprised of a prescription or over-the-counter ("OTC") pharmaceutical, plant-derived products (e.g., cannabis, herbs, spices, etc.), and a flavoring substance, or combination thereof, which is commonly compounded in a liquid comprised of a propylene glycol, vegetable glycerin, oil, water or some other liquid, or combination thereof.

Conventional vaporizers are typically multi-use devices that are often adapted to vaporize different vaporizable material compositions from a variety of manufacturers/suppliers of those substances. To facilitate vaporization by different vaporizers, manufacturers/suppliers of vaporizable material package their respective vaporizable materials in different containers (e.g., cartridges, pods, etc.) specifically configured and adapted for use with a particular vaporizer device. The end-user of a particular vaporizer adjusts the temperature or power setting of the vaporizer to select the vaporization temperature or power setting that controls the heating element that vaporizes the vaporizable material. The selection process is generally a trial and error iterative process comprised of a user setting an initial power or temperature setting, activating the vaporizer to heat the vaporizable material, inhaling the vaporized material, and repeating until the user finds a temperature or power setting that is acceptable.

The inventors here recognized that this trial and error search for a suitably acceptable temperature is typically performed without sufficient information and understanding of the relevant component elements of the vaporizable materials and/or the operation or performance characteristics of the vaporizer, can be elusive and frustrating to the end-user, results in greatly varying levels of user satisfaction experiences even for the same vaporizable material, and is frequently too simplistic to maximize efficacy or consumer satisfaction as it is insufficient to take into account the differences in vaporization temperatures associated with the individual component elements that comprise a particular vaporizable material and thereby produce less than optimal aerosol compositions that may unnecessarily or unintentionally impact a user's health.

SUMMARY

Consistent with the foregoing, described herein are vaporizer devices, systems and methods that are capable of automating control of the vaporization thermal conditions to provide a consistent consumer experience while taking into account the complexities associated with vaporizing vaporizable materials comprised of a plurality of component elements. The devices, systems and methods disclosed herein, for example, are capable of allowing manufacturers and suppliers of consumable vaporizable materials, who are generally most knowledgeable of the composition and characteristic traits of their respective vaporizable material, to exercise control over how their respective products are consumed consistent with their vested interests in maximizing or otherwise enhancing consumer satisfaction. The vaporized material composition of aromatics (e.g. terpenoids), bio-active and pharmacological components, flavorings, water and/or other components of the vaporizable material contained within the vapor or aerosol inhaled by the user, are thereby capable of being better managed and controlled. Additionally, the vaporizers disclosed herein are capable of eliminating the consumer frustration and waste associated with attempting to set a vaporization temperature and the start-up time and the consumption of vaporized material in a sub-optimal manner associated with doing so.

The subject matter described herein relates to vaporizers that are adapted with the capability of heating a vaporizable material in accordance with a thermal profile associated with a particular vaporizable material, including the constituent components thereof. Particular aspects of the disclosed subject matter relate to the manner by which a thermal profile is (i) determined for a particular vaporizable material, (ii) associated with the vaporizable material, and (iii) communicated and employed in connection with control (including automated control) of the vaporizer. Additional aspects are directed to vaporizer user data, including the capture, storage, communication, analysis and presentation of such data.

A "thermal profile" as used herein refers to a heating profile for a vaporization heating cycle that is associated with generating an aerosol or vapor dose for inhalation (e.g., draw or puff) by a user and is defined by a plurality "set points." A "set point" as used herein is defined by both (i) a specified power and/or temperature setting and (ii) a specified duration of time for that setting and is distinct or different from the temperature/power and time associated with the heating ramp-up or ramp-down profiles of the vaporizer.

Additional details regarding the various aspects of the subject matter described herein are set forth in the accompanying drawings and descriptions below and/or are otherwise apparent therefrom. It should be understood that the descriptions and illustrations herein, while illustrative of the various aspects of the disclosed subject matter, it is the claims that are intended to define the appropriate scope of the protected subject matter.

BRIEF DESCRIPTION OF THE DRAWINGS

The accompanying drawings, which are incorporated in and constitute a part of this specification illustrate certain aspects of the subject matter disclosed herein and together with the description, help explain aspects associated with the disclosed implementations.

FIGS. 2A-2B further illustrate how the external device and/or vaporizer may be in further communication with another external computing device such as a server.

DETAILED DESCRIPTION

Figure 1A:
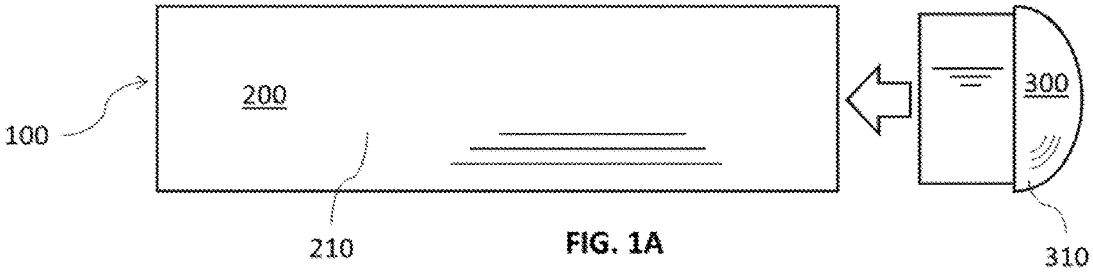
FIGS. 1A-1C illustrates an exemplary two-piece vaporizer generally comprising vaporizer body that controls the heating of a vaporizer cartridge that contains vaporizable material in accordance with the disclosed subject matter.
Figure 1B:
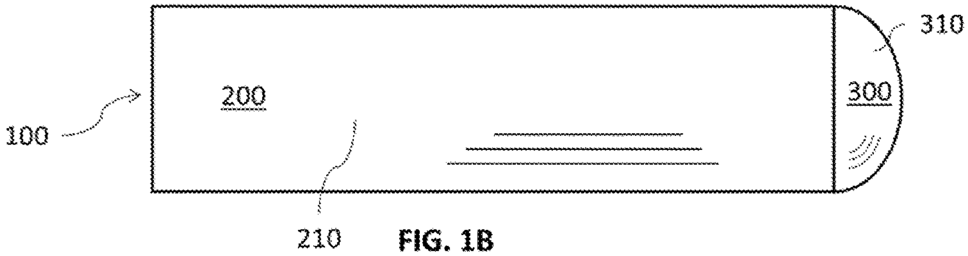

Illustrated in FIGS. 1A-1B is a vaporizer 100 that employs a conventional two-piece configuration comprising a vaporizer body 200 and a reversibly attachable vaporizer cartridge (or pod) 300, each of which being externally defined by a housing or casing 210, 310 respectively that contains and protects electrical, thermal, and other components contained therein. FIG. 1A illustrates the vaporizer 100 with the vaporizer body 200 and vaporizer cartridge 300 being detached from one another. FIG. 1B illustrates the vaporizer 100 with the vaporizer body 200 and vaporizer cartridge 300 attached to one another to facilitate consumer use of the vaporizer 100. The external configuration of the vaporizer cartridge 300 is adapted to being reversibly engaged within a aperture at one of the vaporizer body 200.

Figure 1C:
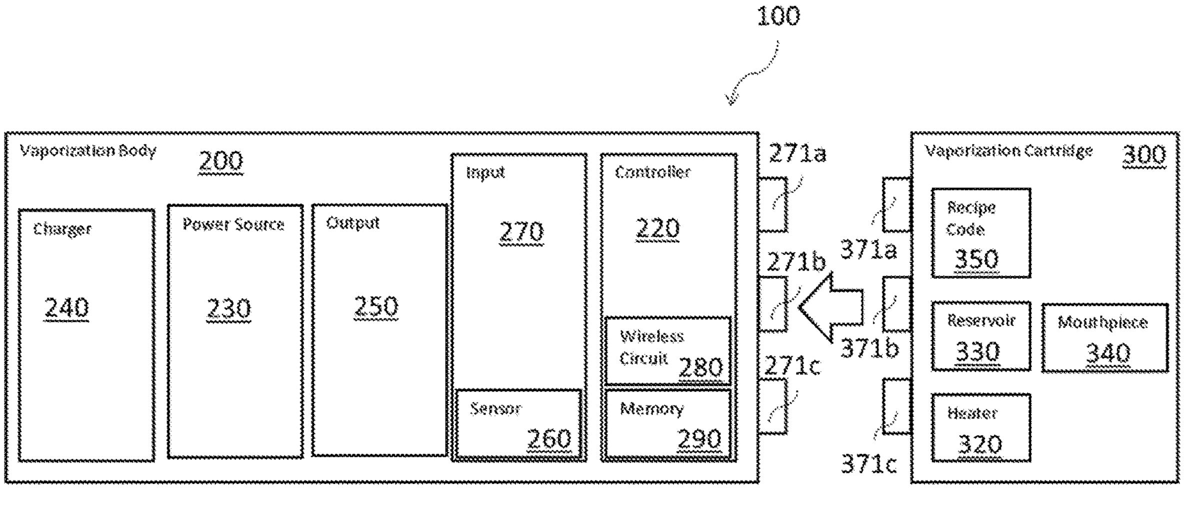

FIG. 1C is a block diagram illustration of the components of the vaporizer 100 with the vaporizer body 200 and vaporizer cartridge 300 detached from one another. The vaporizer body 200 is generally comprised of a controller 220 that controls the application of power or energy from a power source 230 (typically contained within the vaporizer body 200) to the heater 320 contained in the vaporization cartridge 300, which when sufficiently energized heats and vaporizes the vaporizable material that is contained in the reservoir 330 of the vaporizer cartridge 300. The vaporized material (also knowns as "aerosol" or "vapor") is inhaled by the user via an aperture in the cartridge 300 referred to as a mouthpiece 340. The power source 230 may be comprised of any suitable power source including replaceable or rechargeable batteries or power from an external source. A charger (and charging circuit) 240, which may be controlled by the controller 220, may also be provided to power the vaporizer 100 and/or electrically charge a battery. The charger 240 may be a conventional cabled/wired plug-in charger or a wireless charger such as and inductive Qi charger. Vaporizable material is commonly in liquid form but may also be a solid (e.g., wax) or gas or a combination liquid, solid and/or gas.

Figure 2A:
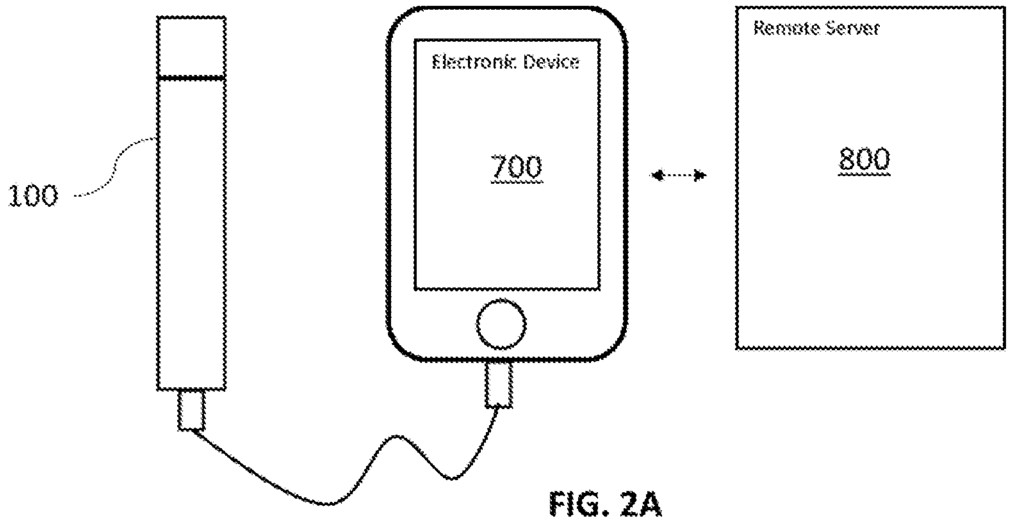
FIGS. 2A-2B illustrate a system where an external device is in communication with the vaporizer via a wired/cabled connection as illustrated in FIG. 2A and via a wireless connection as illustrated in FIG. 2B.

An externally accessible universal serial bus (USB) connection or other suitable connector may be positioned on the vaporizer housing 210 and electrically connected to the charger and/or controller 205 to facilitate powering the vaporizer 100 (or charging the power source/battery thereof) and/or communication over a wired connection between an external device (e.g., electronic devices 700, 800 illustrated in FIG. 2A) and the controller 220.

The vaporizer 100 may also include one or more inputs 270. Such inputs may be one or more buttons, dials, or other user interfaces and/or one or more controller inputs or sensors 260. The sensors 260 may include accelerometers or other motion sensors, biometric sensors, capacitive sensors, flow sensors, pressure sensors, temperature sensors (e.g., ambient, reservoir, heating element temperature), power sensor, GPS or location trackers, timers or clocks, and other use or control sensors, etc., that detect or receive inputs that are communicated to the controller 220 to control the operation of the vaporizer 100 and/or relate to the use and operation of the vaporizer 100 and the collection of data relating thereto. For example, accelerometers, flow sensors, and clocks may detect and track the duration of a consumer's use (via movement and/or inhalation), whereby the controller 220 consistent with that use activates the vaporizer 100 and facilitates power to the heater 320. Sensors 260 may also detect ambient temperature, reservoir 330 temperature, heater 320 temperature, when and/or whether a cartridge 300 is properly engaged within the vaporizer body 200 (e.g., via magnetic or other physical attachment means), when the vaporizer cartridge 300 is depleted, location data, and/or the orientation of the heater 320 so that power to the heater 320 controlled by the controller 220 can be properly regulated in accordance with the teachings herein and/or use data collected, stored (e.g., in memory 290), communicated (e.g., via a cabled/wired or wirelessly), processed and/or presented. The vaporizer 100 may include a user button or other interface that can reset or erase information stored in memory on the vaporizer 100 and/or effectuate a command or instruction, which when externally communicated, resets or erases use data associated with the vaporizer 100 that is stored in an external device (e.g., 700/800 in FIGS. 2A-2B) associated with the vaporizer 100.

As further illustrated in FIG. 1C, the vaporizer body 200 may further comprise one or more outputs 250, which may comprise one or more optical (e.g., LEDs, displays, etc.), tactile (e.g., vibrational, etc.), or sonic (e.g., piezoelectric, etc.) feedback components, or the like, or some combination thereof that can alert or otherwise communicate certain settings or conditions (e.g., dosage, temperature, power, use, cartridge or vaporizable material identification and information, etc.). Thus, for example, by tracking the use of the vaporizer 100 as described above, an alert or other communication can be provided to the user when the user has reached, is about to reach, or exceeds certain dosages.

As illustrated in FIG. 1C, the vaporizer body 200 and cartridge 300 depicted therein includes one or more opposing complimentary electrical contacts 271*a*-271*c* and 371*a*-371*c* that engage each other when the vaporizer cartridge 300 is properly engaged for operation with the vaporizer body 200. The electrical contacts 271*a*-271*c* and 371*a*-371*c* may be of an suitable configuration, such as pins and opposing receptacle, so that when engaged with one another create an electrical circuit between the vaporizer cartridge 300 and body 200. Thus, when the cartridge 300 is properly seated or engaged with the vaporizer body 200, the electrical contacts 271*a*-271*c* on the vaporizer body 200 and the electrical contacts 371*a*-371*c* on the cartridge 300 form an electrical circuit there-between, the vaporizer 100 is capable of transferring power from the power source 230 to the heater 320 and/or exchange data or communications between the vaporizer body 200 and the cartridge 300 via the electrical circuit.

A wireless circuit 280, which is illustrated in FIG. 1C as being located in the vaporizer body 200, may also be provided to facilitate wireless communication with the vaporizer 100. A memory component 290 is also depicted in FIG. 1C to facilitate the storage of data, including for example control programs (e.g., thermal profile control instructions), use information, and input and sensor information including data, commands and/or instructions.

Figure 2B:
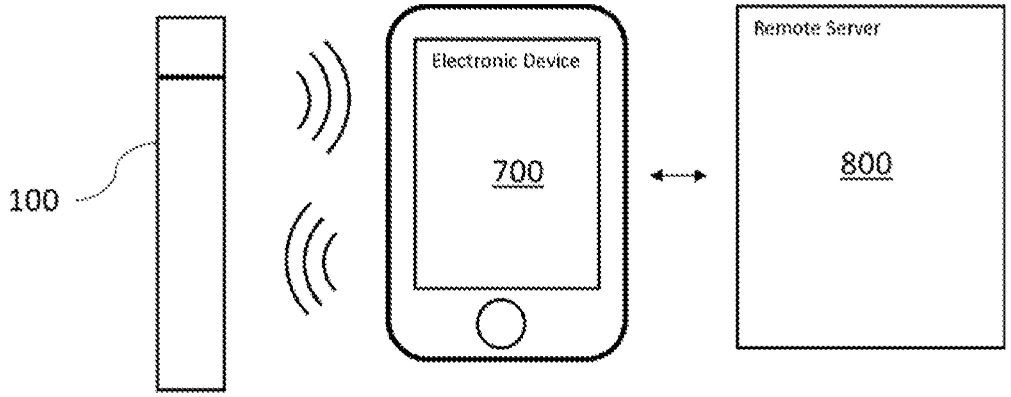

FIGS. 2A-2B illustrate a vaporizer system whereby an external device 700, such as a smart phone or other computing device, may communicate or otherwise exchange data with the vaporizer 100 through a wired/cabled connections (e.g. the USB connector described above) such as that illustrated in FIG. 2A and/or via wireless communication (e.g., Bluetooth or other wireless protocol) with the wireless circuit 280. The external device 700 may in turn communicate and/or otherwise exchange data (via wired and/or wireless communication) with another external computing device such as a server 800. Thus, for example, the external devices 700/800 may be utilized to program the vaporizer 100 (including the vaporizer body and/or vaporizer cartridge) and/or receive data (e.g., use data, such as location, duration, dosage, information on the vaporizable material etc.) from the vaporizer 100.

U.S. Patent Application Publication No. US 2018/0043114 A1 (the Bowen Application), which is hereby incorporated by reference in its entirety, describes in detail vaporizers with similar hardware components to those of the foregoing description of the vaporizer 100 and the operation and structure thereof.

As is recognized herein, the ingredients, ratios, manufacturing methods, and other characteristics of vaporizable material varies greatly. Consequently, how and under what conditions vaporizable material is vaporized can materially impact efficacy of the consumed aerosol and consumer satisfaction. Some conventional vaporizer devices and systems allow users to manually control the power to the vaporizing heating element and thereby set, either directly or indirectly, the vaporization temperature. Some newer vaporizers and vaporizer systems, such as those disclosed in the Bowen Application, include a software application on an external digital device and an "identifier" component by which identification of the cartridge and/or vaporizable material contained within the cartridge may be communicated to the vaporizer to facilitate basic control over the vaporizer.

None of these conventional or newer vaporizers, however, effectuate automated control of the operation of a vaporizer to implement a particular "thermal profile" or correlates or associates such a thermal profile with the vaporizable material and/or cartridge containing the vaporizable material.

Figure 3A:
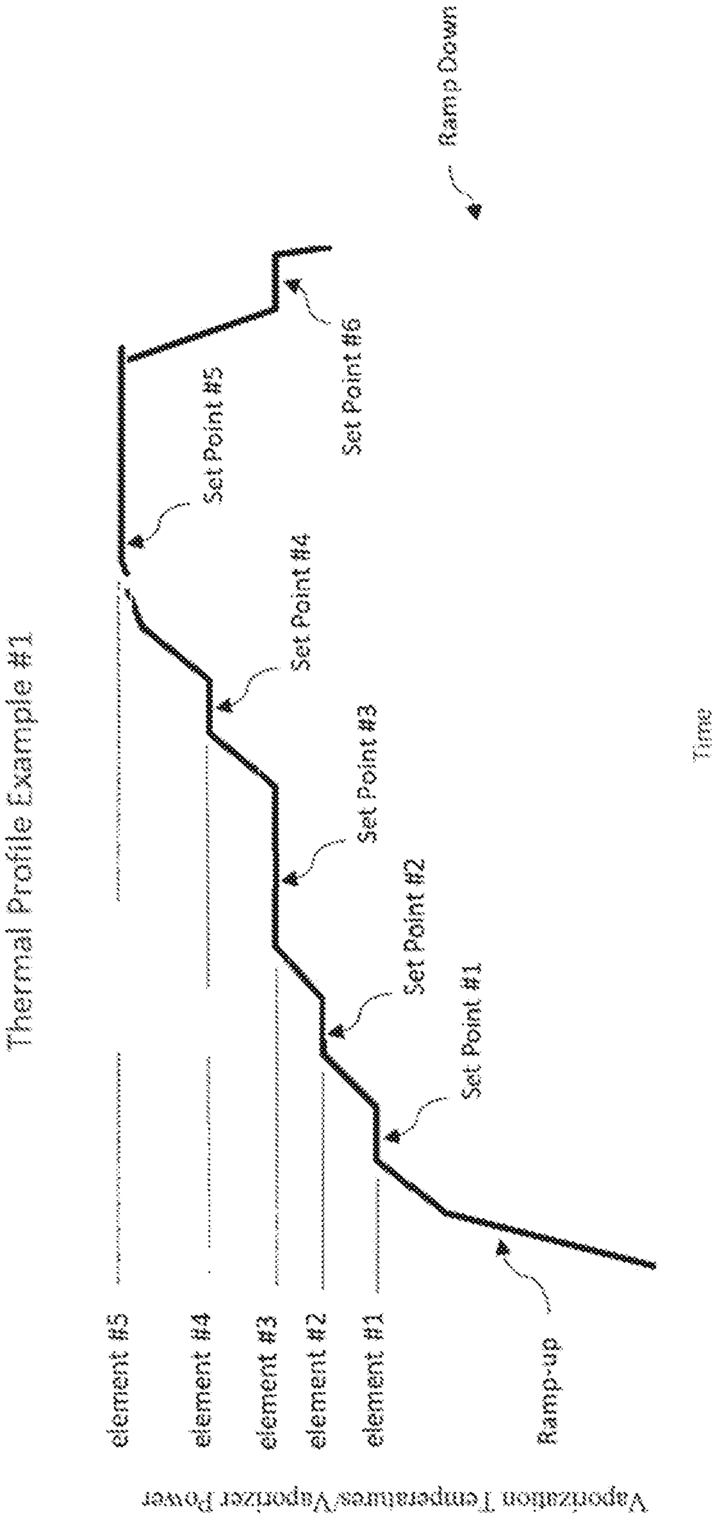
FIGS. 3A-3B illustrates two exemplary thermal profiles comprising a plurality of set points that are graphed on the vertical axis against vaporization temperatures of selected constituent elements of a vaporizable material and on the horizontal axis against time associated with an end-user inhalation of vaporized material from the vaporizer.
Figure 3B:
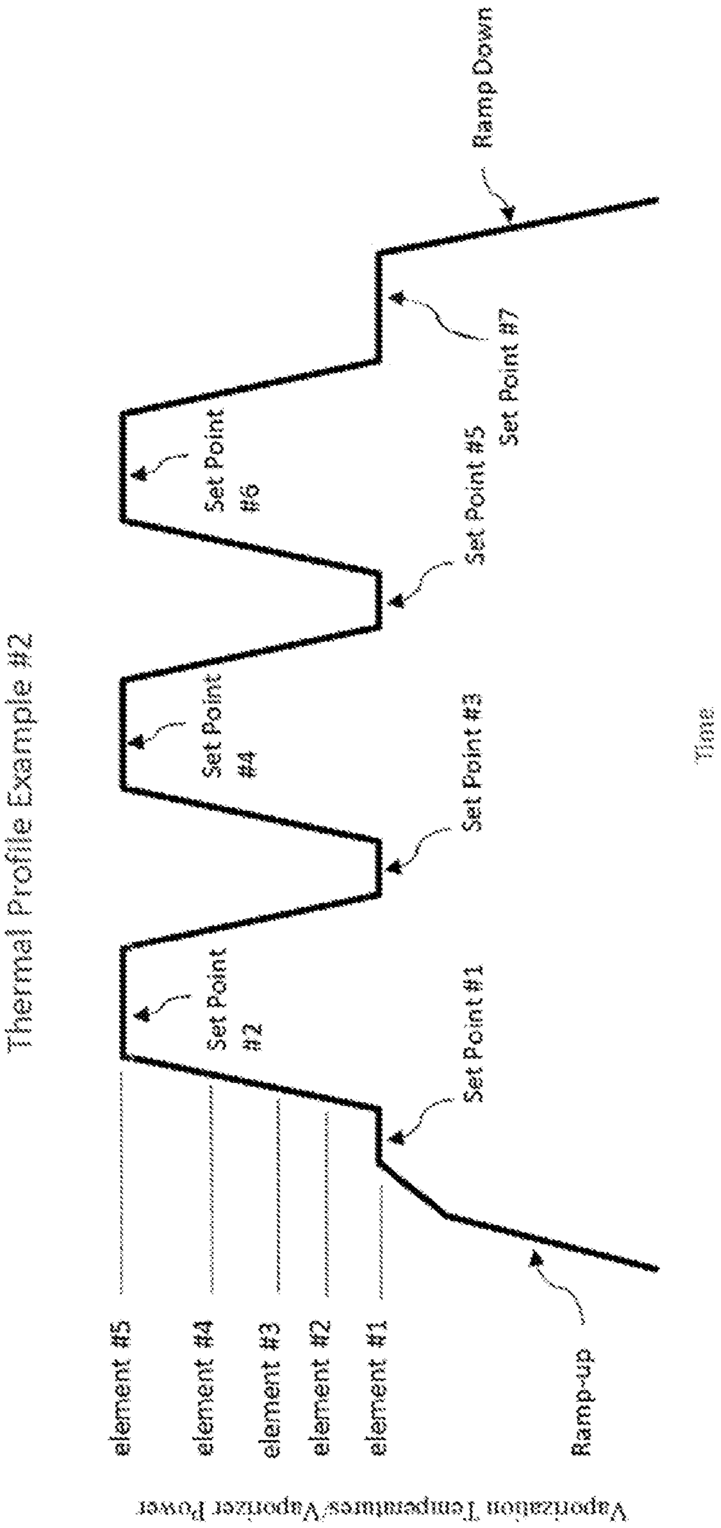

As illustrated in FIGS. 3A-3B and previously summarized, a "thermal profile" as used herein refers to a heating profile for a vaporization heating cycle that is associated with generating an aerosol or vapor dose for inhalation (e.g., draw or puff) by a user and is defined by a plurality "set points." A "set point" as used herein is defined by both (i) a power and/or temperature setting (e.g., Temp1, Temp2, Temp3, Temp4, Temp5, etc.) and (ii) a specified duration of time (e.g., T1, T2, T3, T4, T5, etc.) associated with that setting. A "set point" is distinct or different from the temperature/power and transient time associated with the heating ramp-up or ramp-down profiles of the vaporizer.

The different set points that define the thermal profile allow the different constituents elements of the vaporizable material to vaporize for set period of time and at a set temperature (or temperature range) and thereby control the composition of the vapor or aerosol generated from the vaporized material and inhaled by the consumer. Implementing a thermal profile to vaporize a material is capable of improving efficacy and consumer satisfaction (while also mitigating against potentially undesirable, less than optical, or unhealthy aerosol components), by more selectively controlling the mix of constituent elements of the vaporizable material that are ultimately contained within an aerosol or vapor dose of the vaporized material that is inhaled by the user. This is so because the vaporized amount of any given component element of vaporizable material is dependent on the particular element's vaporization temperature and the duration that the element is heated at or above its vaporization temperature. Since each element of a vaporizable material may contribute to a desired pharmacological, pharmakinetic, flavor, or other attribute of the vaporized material, employing a thermal profile specific to the vaporizable material to control the vaporization conditions can significantly impact efficacy and consumer satisfaction.

FIG. 3A illustrates one example of a representative thermal profile in accordance with the subject matter disclosed herein. The thermal profile illustrated in FIG. 3A is comprised of five (5) consecutively escalating set points that generally correspond to the vaporization temperatures of various selected constituent elements #1 through #5 identified on the vertical axis of the illustrated graph and one set point (#6) on a deescalating portion of the thermal profile that corresponds with the vaporization temperature of constituent element #3. Thus, six (6) set points define the thermal profile illustrated in FIG. 3A.

FIG. 3B illustrates another example of a representative thermal profile in accordance with the subject matter disclosed herein. The thermal profile illustrated in FIG. 3B is comprised seven (7) set points comprised of two repeating set points that correspond with the vaporization temperature of element #1 and element #5 with the intermediate vaporization temperatures of elements #2-4 residing there between.

While a thermal profile is defined as noted above by a plurality of set points, a "heating and cooling profile" that employs a thermal profile, as used in this disclosure, is defined by both the thermal profile and the transient heating and cooling profiles that occur from one steady state (e.g., set point #1) to another steady (e.g., set point #2). Thus, the line graphs illustrated in FIGS. 3A and 3B, when viewed in their entirety, illustrate a heating and cooling profile that is defined in part by the thermal profile set points and the transient heating and cooling profiles of the heating element 320. The transient heating and cooling profiles are generally determined by the inherent thermodynamic properties of the heater 320 and the amount and rate of power being transferred to the heater 320. Thus, the transient heating and cooling profiles can be engineered and/or programmed to perform in an intended or desired manner to achieve an overall heating and cooling profile.

Figure 3C:
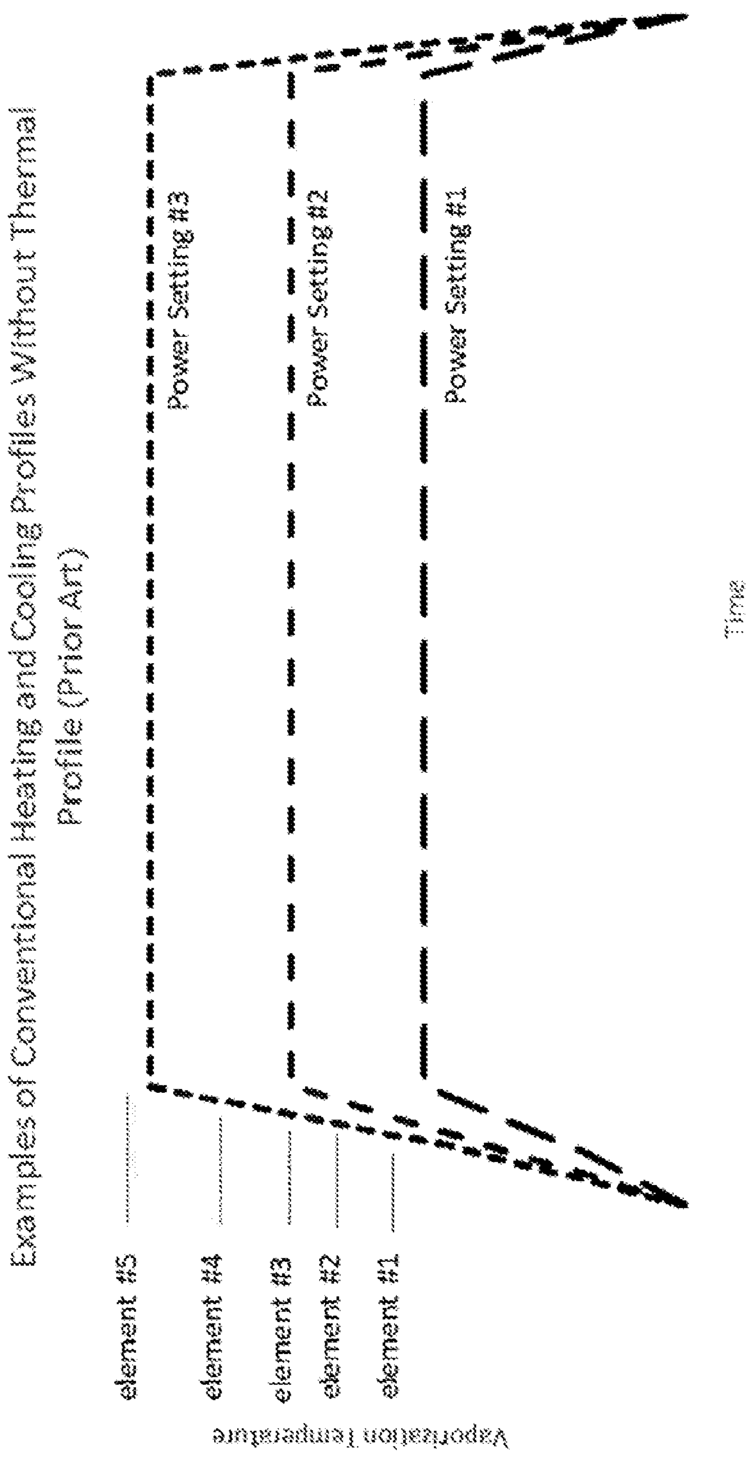
FIG. 3C illustrates a conventional vaporizer wherein a single temperature of power setting is used to vaporize the constituent elements of a vaporizable material. For purposes of illustration three different temperature/power settings are graphed on the vertical axis against the vaporization temperatures of the selected constituent elements of the vaporizable material illustrated in FIGS. 3A-3B and on the horizontal axis against time associated with an end-user inhalation of vaporized material from the vaporizer.

In contrast to FIGS. 3A and 3B, FIG. 3C illustrates a heating and cooling profile of a conventional vaporizer that includes a thermal control that pre-selects or otherwise allows a user to select a single temperature or power setting for vaporization of vaporizable material to generate a dose for inhalation by the user. Set points #1-#3 are each representative of a single temperature or power setting. The user often times selects the temperature or power setting that is insufficient or too elevated such that vaporizable material goes un-vaporized or is vaporized unnecessarily at a less than optimal temperature. Thus, as illustrated in FIG. 3C, a low temperature/power setting selection (Temp/Power Setting #1) is insufficient to vaporize elements #1-#5, the mid-temperature/power setting (Temp/Power Setting #2) while capable of vaporizing elements #1-#3, is insufficient to vaporize elements #4 and #5, and the high temperature/power setting selection (Temp/Power Setting #3) while capable of vaporizing all or almost all of elements #1-#5, the relatively high setting indiscriminately vaporizes those elements and does so at a temperature greater than needed (or necessarily optimal) for elements #1-#4.

It should be understood that the thermal profiles and the heating and cooling profile defined thereby that are illustrated in FIGS. 3A and 3B are merely representative. Thus, the number of set points and their relative temperature and duration may be modified or customized for a particular vaporizable material to effectuate a desired vaporized material composition for each inhalation or series of inhalations. Thus, for example, the thermal profile illustrated in FIG. 3A may extend over two or more inhalations with the first inhalation extending to Set Point #3 and the second inhalation extending from Set Point #3 to Set Point #6. Alternatively, with respect to the thermal profile illustrated in FIG. 3B, each inhalation may extend from Set Point #1 to Set Point #2 to Set Point #1. It should be understood, that the transient heating and cooling profiles may be also engineered and/or programed to effectuate or implement an overall heating and cooling profile for a particular vaporizable material and vaporizer that is capable of generating an aerosol or vapor composition that is more effective and/or satisfying to the consumer.

Further, it should be understood, that while each set point in the thermal profiles illustrated in FIGS. 3A and 3B are illustrated as corresponding to a specific temperature, the specified or programed temperature for a thermal profile may not be exactly achieved by the vaporizer 100. Thus, one of ordinary skill in the art would understand that a particular specified temperature in a thermal profile encompasses a reasonable expected range of values consistent with the capability of the particular vaporizer utilized. Thus, for example, if a vaporizer is capable of achieving a set point temperature of 350 degrees Fahrenheit with precision of +/−3 degrees Fahrenheit then a specified set point of 350 degrees Fahrenheit would encompass a range of 347-353 degrees Fahrenheit.

Similarly, a set point temperature may be defined by a temperature range as opposed to a single temperature. For example, a particular set point may be defined by a temperature range between 340-350 degrees Fahrenheit for a period of 0.5 seconds. Further, a set point may be defined by a power setting or range thereof and a duration of time as opposed to a temperature setting or range thereof and a duration of time. Thus for example, a set point may be defined by the number of watts (or other indicia or measurement of power) or a wattage range and a duration of time (e.g. 0.5 seconds). Power and temperature, in the context of defining a thermal profile, therefore can be considered proxies for one another. Other proxies for power and/or temperature may be used and/or substituted therefore in defining a thermal profile set point.

Further, it should be understood that although there are different inhaling techniques, a single inhalation typically occurs in a very short time period, typically from less than a second to approximately four (4) seconds in duration. During that time the consumer is primarily focused on inhaling vaporized materials. Accordingly, even if the consumer had knowledge of each constituent element contained in the vaporizable material, understood the vaporization temperature of each of those constituent elements, and developed a desired thermal profile for vaporizing the vaporizable material consistent with this knowledge, the consumer would have great difficulty to implement a thermal profile or do it with any precision or accuracy using the user controls for such conventional vaporizers. Moreover, users are typically not provided sufficient information on the physical and chemical properties of the component elements of the vaporizable material and the interrelationship between those constituent elements and even if user's were to provide them may not sufficiently understand them to effectuate a satisfactory thermal profile.

Thus, the vaporizer 100 disclosed herein has the capability of automating thermal profile control through the use of a thermal profile recipe code 350 associated with the vaporizable material. As illustrated in FIG. 1C, the controller 220 of the vaporizer 100 implements a heating and cooling profile defined in part by the thermal profiles consistent with and in accordance to the thermal profile recipe code 350. The thermal profile recipe code 350 may also dictate, at least to some degree, the transient heating and cooling profiles of the heating and cooling profile by controlling or otherwise dictating the rate and/or amount of power the controller 220 is allowed to transfer to the heater 320.

The thermal profile recipe code 350 may be implemented in hardware and/or software to effectuate a desired thermal profile (and more broadly the heating and cooling profile defined thereby) via instructions to the controller 220 relating to the regulation of power to the heater 320. The thermal profile recipe code may be embodied on an electronic circuit, such as integrated circuit or microchip or a memory component (e.g., DRAM, FRAM, RFID, NFC tag, etc.) Thus, for example, the thermal profile recipe code 350 may be a thermal profile program (or compilation of programs) comprising an executable set of instructions that when processed by the controller 220 effectuates the thermal profile. Alternatively, the thermal profile recipe code 350 may be a thermal profile identifier that corresponds to a thermal profile that is pre-programmed and/or stored in the vaporizer memory 290, such that for example when the cartridge 300 is engaged with the vaporizer body 200, the thermal profile identifier is read and used to select or identify the appropriate thermal profile program stored in the vaporizer memory 290.

The thermal profile information encoded in the thermal profile recipe code 350 may comprise a single or multiple thermal profiles (or thermal profile identifiers), the implementation of later may depend on the use conditions. Thus, for example, varied thermal profiles may be implemented based on the number of inhalations and/or the length of those inhalations. A particular thermal profile (or thermal profile identifier) may be encoded for use for a single slow long draw or inhalation, while one or more different thermal profiles (or thermal profile identifier) may be encoded for use for multiple quick short draws or inhalations, either individually or across a plurality of those inhalations. Hence, the thermal profile information encoded on the thermal profile code 350 may be correlated with variations in the actual or anticipated use of the vaporizer 100. Use-specific or adapted thermal profiles can be implemented in a variety of ways. For example, via pre-programing the thermal profile information and associating that information with specific use conditions. Those use conditions may be known, selected, or provided by the end-user or derived or learned from user data.

Alternatively, a particular thermal profile may be adaptively modified via feed-back or adaptive control data, user interface inputs, or sensor data. The vaporizer sensors 260 inputs 270 may be utilized by the controller 220 in effectuating the thermal profile. Thus, for example ambient temperature and pressure sensor may provide data on the reservoir temperature that allows the controller to better regulate the power to the heater 320 to more accurately effectuate the desired thermal profile. Thus, it is contemplated that the controller 220 may utilize feed-back or adaptive control to effectuate a thermal profile. The adaptive control may include, for example, user interface inputs 270 that facilitate user modification or adjustment of the thermal profile, e.g., adjusting the thermal profile temperature upward or downward, compressing or expanding the length of the thermal profile, or selecting an option whereby the thermal profile is to be applied by the controller over a specified series of inhalations or draws (e.g., over 1, 2, 3, or 4 etc. draws), escalating or deescalating power to the heater 320, increasing or decreasing duration and or temperature of one or more set point, removing or adding set points, or any combination thereof.

The thermal profile recipe code 350 may be comprised of a volatile or non-volatile memory component, wherein a thermal profile program (or thermal profile identifier) is encoded, together with circuitry capable of communicating the encoded thermal profile information either directly or indirectly to the controller 220. Communication of the encoded thermal profile information may be via the electrical circuit created between the electrical contacts 271*a*-271*c* on the vaporizer body 200 and the electrical contacts 371*a*-371*c* on the cartridge 300. Alternatively, the thermal profile information may be stored in an near field communication ("NFC") or radio frequency identification ("RFID") tag or other memory tag, located on the vaporizer cartridge 300 and read by the wireless circuit 280 or other suitably adapted reader on the vaporizer body 200 (or in communication with the vaporizer) where once read is either stored into memory 290 for later use (and/or directly used) to instruct the controller 220 to effectuate the desired thermal profile upon use or inhalation of the vaporizer 100.

Activation and deactivation of the vaporizer 100 may be achieved manually via a button, shaking, audible command, or by sensing air flow, pressure drop, or capacitive changes resulting from the user inhaling or interacting with the mouthpiece 340 of the vaporizer 100. The duration of the activation may be coextensive with, exceed or be less than the duration of the thermal profile.

As discussed above, conventional vaporizers and sourcing models do not take into account implementing a heating profile that corresponds to a thermal profile associated with a particular vaporizable material. Rather, there is a long drawn out process that manufacturers of vaporizable material and manufacturers of vaporizers go through to source a vaporizer for a particular vaporizable material to market. The process involves numerous meetings and often times physical modifications of the vaporizer and ultimately leaves the end-user to blindly adjust the temperature or power setting of the vaporizer through a trial and error approach that is fundamentally incapable of implementing a thermal profile for the particular vaporizable material. Since differences in composition, chemistry, viscosity, color, flavor, manufacturing methods, and/or environmental conditionals may impact the desired or optimal vaporization of a vaporizable material, the disclosure here contemplates that those most knowledgeable of the vaporizable material (i.e., the vaporizable material experts) are in a preferred positioned of knowledge to define a thermal profile for that vaporizable material and are also vested in achieving the highest consumer satisfaction.

The thermal profiling defining process may include the following representative steps. The vaporizer device manufacturer provides a programmable vaporizer unit that is capable of programing and recording a thermal profile, testing, and adjusting or optimizing the thermal profile for a particular vaporizable material. This step may be aided with the user of an external computing device 700/800 depicted in FIG. 2A-2B that is capable of depicting or otherwise presenting, adjusting, and documenting the thermal profile and the overall heating and cooling profile of the vaporizer 100. Through the use of the programmable vaporizer unit, the manufacturer or supplier of the vaporizable material determines (through testing or otherwise) the desired or optimal thermal profile for its vaporizable material in the context of a heating and cooling profile that takes into account transient heating and cooling profiles associated with the vaporizer 100. It is contemplated that this process can be achieved during a single meeting between the manufacturer of the vaporizer and the manufacturer of the vaporizable material. Once defined, the thermal profile is documented so that it can be encoded to a memory component of the thermal profile recipe code 350. The thermal profile is then associated with the vaporizable material during the packaging process of the cartridge 300 by way of including a corresponding thermal profile recipe code 350 on (or in) the cartridge 300. The cartridge 300 containing the vaporizable material and corresponding thermal profile recipe code 350 is then shipped to end-users for consumption. Once the end-users insert the cartridge 300 into the vaporizer body 200, the pre-programmed thermal recipe code 350 is automatically communicated to the vaporizer body 200 as previously described, which in response thereto implements a heating and cooling profile via the controller 220 in accordance with the thermal profile information encoded in the thermal profile recipe code 350. Each end-user, therefore, is capable of having a consistent and common vaporization experiences for a particular vaporizable material and vaporizer 100 without waste or frustration and with the full knowledge that the vaporizable material is being properly and safely consumed in the manner intended by the manufacturer/supplier of the vaporizable material.

Use data, including the types of products used over a period of time, duration between usage, buying frequency, usage rate, capacity of contents within a vaporization cartridge, usage habits, inhalation rate, duration of inhalation, user toleration, time of day, learned usage related to time or day or date, position of device, agitation of device, movement of device, environment, humidity, temperature, altitude, consumer input such as, user intent, height, weight, age, gender, body measurements, hobbies, interests, employment status, type of employment, preferred method of use, experience with vape devices, experience with specific contents, level of discretion, desired size of vaporization cloud, social application (such as performances, family events, etc.), taste preferences, correlation to meals, intensity of specific elements, battery life and/or a plurality of other factors can be tracked and stored in memory 290 and either retained therein or communicated to an external device 700 or 800.

The use data can be analyzed in connection with adapting, adjusting, or creating alternative or derivative thermal profiles from those originally defined and encoded on the thermal profile recipe code 350. These alternative or derivative thermal profiles can then be loaded into memory 290 of the vaporizer body 200 or vaporizer cartridge 300.

The use data can also inform, provide a platform for, enhance, or otherwise be used to support, create, or facilitate interactions between end-users, vaporizable material manufacturers, vaporizer device manufacturers, and/or others via social media, online or traditional marketing or communications. Additionally use data, may be provided to end-users so they can track or analyze usage of their vaporizers. The data may be presented as a dashboard summarizing selected use metrics, which can be communicated to the user directly via a suitable output or transmitted or otherwise communicated to an external device, such as the user's smart phone or computing device.

Further, when a vaporizer is prescribed or desired to be used in a predetermined manner, a scheduling system can push notifications to the end-user, a company, or medical advisor to prompt the timely use of a vaporizer. The scheduling system and/or schedule can be on specialized or generic application residing on an external device or server 700, 800 that is capable of communicating with the user directly, or via the vaporizer output 250 or another device such as a smart phone or pager. Alternatively the scheduling system and/or schedule can be programmed in the vaporizer memory 290 or encoded onto the thermal profile recipe code 350 on the cartridge 300 and provide notifications to the end-user directly via the vaporizer 100 and/or to the user's external device such as smart phone or watch. The scheduling system may notify or otherwise remind the user to use the vaporizer 100 to inhale a specific vaporizable material using a specific thermal profile at a specified time or frequency, which may be based on body metrics such as heart rate, blood pressure, cardiac rhythm, or other biological or physiological conditions or measurements that are known or obtained by the inputs 270 of the vaporizer 100, an external device 700/800 such as a smart phone or watch, or from the health records of the user. Notification or alerts can include audible, visual, vibration, and/or electronic notices that are communicated to the user via the vaporizer 100 or an external device 700 like a smart phone or watch or the like.

Figure 4:
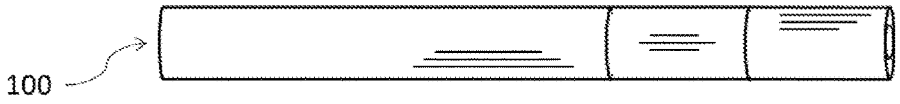
FIG. 4 illustrates a one-piece vaporizer form factor in which the vaporization body and vaporization cartridge are not adapted to being disengaged from one another by the user.

While the foregoing disclosure is described in the context of a two-piece vaporizer 100, it should be understood that the subject matter may be readily implemented in any vaporizer including a vaporizer 100' that does not use a detachable cartridge, such as that illustrated in FIG. 4. In such an implementation, for example, the components described in connection with FIGS. 1A-1C would be contained within the vaporizer 100'. The electrical circuitry, including that created by electrical contacts **271*a*-271*c* and 371*a*-371*c* may be substituted with hardwired circuit(s) or be part of an integrated circuit, ASIC or PCB that includes the controller, memory, communication circuitry (e.g., 220, 290, 280); input and output circuitry (including sensor circuitry) (e.g., 270, 250, 260); charging and power regulation circuitry (e.g., 230, 240); and thermal profile code 350, which may be part of the controller 220 or memory 290 or may remain as a separate component. The vaporizable material may be packaged with information for the user to select or download the thermal profile code 350 to the vaporizer device 100'** or such information may be available from the vaporizable material manufacturer or third party website or database accessible by the user.

The foregoing disclosure describes by way of illustration and examples specific embodiments in which the subject matter may be implemented or practiced. It should be understood that other embodiments may be utilized and that structural and logical substitutions and changes may be made that fall within the scope of this disclosure, which is intended to cover any adaptations and variations of the various embodiments disclosed herein and combination of the various features and component elements thereof.

What is claimed is:

1. A vaporizer comprising:

a vaporizer body that includes a housing that encapsulates a rechargeable power source and a controller that regulates the power from the power source; and a vaporizer cartridge that includes a reservoir containing vaporizable material, a heating component adapted for vaporizing the vaporizable material, and a pre-programed thermal profile recipe code corresponding to the vaporizable material;

wherein said pre-programed thermal profile recipe code instructs the controller to regulate the power to the heater to implement a specific thermal profile for vaporizing the vaporizable material, wherein said pre-programed thermal profile recipe code implements a thermal profile determined by the manufacturer of the vaporizer, and wherein the determination of the thermal profile is based on analysis of use data of a user.

2. The vaporizer of claim 1, wherein said pre-programmed thermal profile recipe code is stored in a memory component located on the cartridge.

3. The vaporizer of claim 1, wherein said pre-programmed thermal profile recipe code is communicated to a memory component located within the vaporizer body.

4. The vaporizer of claim 1, wherein said pre-programmed thermal profile recipe code is communicated to the controller via an electrical connection between the vaporizer cartridge and vaporizer body.

5. The vaporizer of claim 1, wherein said thermal profile corresponds with one or more vaporization temperatures of constituent elements of the vaporizable material.

6. The vaporizer of claim 1, wherein said vaporizer body further includes user interface inputs and said thermal profile may be adjusted upward or downward in temperature or power by the end-user via said user interface inputs.

7. The vaporizer of claim 1, wherein said vaporizer body further includes user interface inputs and said thermal profile may be compressed or extended in time by the end-user via said inputs.

8. The vaporizer of claim 1, wherein said thermal profile extends across a series of multiple user inhalations.

9. The vaporizer of claim 1, wherein the thermal profile extends across a series of user inhalations.

10. The vaporizer of claim 1, wherein the thermal profile extends across only a single inhalation.

11. The vaporizer of claim 1, wherein the pre-programmed thermal profile recipe code is encoded on the cartridge at the time of packaging the vaporizable material.

12. The vaporizer of claim 1, wherein said use data includes a usage rate.

13. A vaporizer comprising:

a vaporizer body that includes a housing that encapsulates a rechargeable power source and a controller that regulates the power from the power source; and a vaporizer cartridge that includes a reservoir containing vaporizable material, a heating component adapted for vaporizing the vaporizable material, and a pre-programed thermal profile recipe code corresponding to the vaporizable material;

wherein said pre-programed thermal profile recipe code instructs the controller to regulate the power to the heater to implement a specific thermal profile for vaporizing the vaporizable material, wherein the vaporizer is configured to store use data and communicate with an external computing device, and wherein an alert is provided by the vaporizer to the external computing device if a predetermined use is reached.

14. The vaporizer of claim 13, wherein said thermal profile corresponds with one or more vaporization temperatures of constituent elements of the vaporizable material.

15. The vaporizer of claim 13, wherein said use data including a usage rate.

16. The vaporizer of claim 13, wherein said thermal profile extends across a series of multiple user inhalations.

17. The vaporizer of claim 13, wherein the thermal profile extends across a series of user inhalations.

18. The vaporizer of claim 13, wherein the thermal profile extends across only a single inhalation.

19. A method of making a vaporization device comprising:

providing a vaporizer body that includes a housing that encapsulates a rechargeable power source and a controller that regulates the power from the power source;

providing a vaporizer cartridge that includes a reservoir containing vaporizable material, a heating component adapted for vaporizing the vaporizable material;

analyzing use data to derive user desired thermal profiles;

encoding a thermal profile recipe code based on the derived user desired thermal profiles;

storing the use data and communicating with an external computing device; and providing an alert, by the vaporizer, to the external computing device if a predetermined use is reached.

20. The method of claim 19, wherein said use data including a usage rate.

* * * * *